(12) United States Patent
Kayati et al.

(10) Patent No.: US 8,834,178 B2
(45) Date of Patent: Sep. 16, 2014

(54) MANIPULATION DEVICE CONFIGURED TO BE USED WITH AN INTERACTIVE WHITEBOARD AND AN INTERACTIVE TEACHING SYSTEM INCLUDING THE SAME

(75) Inventors: Joanne D. Kayati, Worthington, OH (US); Melissa Webber, Worthington, OH (US)

(73) Assignee: Joanne D. Kayati, Worthington, OH (US)

( * ) Notice: Subject to any disclaimer, the term of this patent is extended or adjusted under 35 U.S.C. 154(b) by 0 days.

(21) Appl. No.: 13/464,866

(22) Filed: May 4, 2012

(65) Prior Publication Data

US 2012/0282590 A1 Nov. 8, 2012

Related U.S. Application Data

(60) Provisional application No. 61/483,033, filed on May 5, 2011.

(51) Int. Cl.
*G09G 5/00* (2006.01)

(52) U.S. Cl.
USPC .......................................................... 434/408

(58) Field of Classification Search
USPC .......................................................... 434/408
See application file for complete search history.

(56) References Cited

U.S. PATENT DOCUMENTS

| 6,220,250 | B1 * | 4/2001 | Park | 132/73 |
| 7,649,133 | B2 * | 1/2010 | Lento | 84/422.4 |
| 2007/0289687 | A1 * | 12/2007 | Floyd | 156/1 |
| 2008/0300062 | A1 * | 12/2008 | Stucke et al. | 463/43 |

* cited by examiner

*Primary Examiner* — Sam Yao
*Assistant Examiner* — Robert P Bullington
(74) *Attorney, Agent, or Firm* — The Law Office of Partick F. O'Reilly III, LLC

(57) ABSTRACT

A manipulation device, which is configured to be used with an interactive whiteboard, includes an elongated rod and a body portion. The elongated rod is connected to the body portion at one of its ends, and the body portion has an outer surface with a layer of foam disposed thereon. The layer of foam disposed on the body portion is configured to be displaced along an outer display surface of an interactive whiteboard so as to facilitate a manipulation of objects displayed on the interactive whiteboard by a user thereof. According to another aspect of the invention, the manipulation device is provided as part of an interactive teaching system, wherein the manipulation device is used in conjunction with an interactive whiteboard having an outer display surface, the interactive whiteboard being operatively coupled to a data processing device.

19 Claims, 9 Drawing Sheets

MANIPULATION DEVICE CONFIGURED TO BE USED WITH AN INTERACTIVE WHITEBOARD AND AN INTERACTIVE TEACHING SYSTEM INCLUDING THE SAME

CROSS-REFERENCE TO RELATED APPLICATIONS

This patent application claims priority to, and incorporates by reference in its entirety, U.S. Provisional Patent Application No. 61/483,033, entitled "Manipulation Device Configured To Be Used With An Interactive Whiteboard And An Interactive Teaching System Including The Same", filed on May 5, 2011.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to manipulation devices for selecting and/or moving electronic images on a graphical user interface. More particularly, the invention relates to a manipulation device for selecting and/or moving electronic images on an interactive whiteboard.

2. Background

An interactive whiteboard (IWB) is a large interactive display device that is operatively connected to a data acquisition/data processing device (i.e., a computer) and a projector. In a typical arrangement, a projector projects the desktop of the computer onto the interactive whiteboard's outer front surface such that users are able to control the computer using a finger or other device. The interactive whiteboard is typically mounted to a wall, and thus, is elevated a substantial distance above the surface of the floor.

Recently, interactive whiteboards have become very popular in educational institutions because they offer teachers an interactive means by which traditional school subjects can be made more appealing to students. In fact, it was expected that, by sometime last year, one in every seven classrooms in the world would have an interactive whiteboard installed therein. Interactive whiteboards are becoming commonplace not only in secondary schools, but also in primary schools.

While interactive whiteboards are very useful teaching devices, it is not always easy for users to manipulate objects on the display surface of the interactive whiteboard. This problem is particularly prevalent among the younger children in primary schools. Many of these children have great difficulty in moving objects across the interactive whiteboard display surface with their fingers. To compound the problem, many of the interactive whiteboards in primary school classrooms are mounted at a height on the wall that is not readily reachable by young children who typically have a small stature. Consequently, because it is difficult for young children to manipulate objects on the interactive whiteboard, their enjoyment of the potentially valuable learning experience offered by interactive whiteboards is greatly diminished. In addition, because the lessons being taught by teachers are being continually disrupted by the inability of the children to effectively utilize the interactive whiteboard, their enjoyment of activities being performed on these whiteboards is likewise decreased.

Therefore, what is needed is a device that facilitates the manipulation of objects on the display surface of an interactive whiteboard, and an interactive teaching system that employs the same. Such a device would greatly enhance the interactive learning experience facilitated by interactive whiteboard systems, thereby enabling students and their teachers to realize the substantial benefits offered thereby.

BRIEF SUMMARY OF THE INVENTION

Accordingly, the present invention is directed to a manipulation device configured to be used with an interactive whiteboard and an interactive teaching system including the same, which substantially obviates one or more problems delineated above.

One object of one or more embodiments of the present invention is to provide a manipulation device that facilitates the manipulation of objects on an interactive whiteboard.

Another object of one or more embodiments of the present invention is to provide a manipulation device that enables a user of an interactive whiteboard having a small stature to more easily reach and manipulate objects on the display surface of the interactive whiteboard.

Yet another object of one or more embodiments of the present invention is to provide an interactive teaching system that utilizes a manipulation device that makes it easier for a user to manipulate objects on the display of an interactive whiteboard.

The aforedescribed objects are merely illustrative in nature. Additional objects and advantages of the present invention will be apparent from the following detailed description, the accompanying drawings, and the appended claims.

To achieve one or more of these objects and advantages, in accordance with a first aspect of the present invention, there is provided a manipulation device configured to be used with an interactive whiteboard, which includes: an elongated rod; a body portion, the elongated rod being connected to the body portion at one of its ends, the body portion having a substantially flat surface that extends in a direction which is substantially parallel to the extending direction of the elongated rod; and a layer of foam disposed on the substantially flat surface of the body portion, the layer of foam having two substantially flat surfaces that are oriented generally parallel to one another, the first of the two substantially flat surfaces being an inner surface disposed adjacent to the substantially flat surface of the body portion, and the second of the two substantially flat surfaces being an outer surface that is disposed on a side of the layer of foam that is opposite to the side of the layer of foam on which the inner surface is disposed. In this embodiment, the outer surface of the layer of foam is configured to be displaced along an outer display surface of an interactive whiteboard so as to facilitate a manipulation of objects displayed on the interactive whiteboard by a user thereof.

In a preferred embodiment of this aspect of the present invention, the manipulation device further includes a gripping device disposed on an end of the elongated rod that is opposite to the end on which the elongated rod is connected to the body portion.

In another preferred embodiment, the body portion has a semi-ellipsoidal shape.

In yet another preferred embodiment, the body portion further includes a curved surface adjoining the substantially flat surface, the elongated rod being connected to a bottom portion of the curved surface.

In still another preferred embodiment, the elongated rod and/or the body portion is formed from wood.

In yet another preferred embodiment, the elongated rod is formed from plastic.

In still another preferred embodiment, the elongated rod is formed from metal.

In yet another preferred embodiment, the elongated rod has a length that is between approximately four to approximately eight times greater than a length of the body portion (or between four and eight times greater than a length of the body portion).

In still another preferred embodiment, the layer of foam comprises a closed cell, ethylene-vinyl acetate (EVA) or a polyethylene (PE) craft foam.

In yet another preferred embodiment, the body portion resembles one of the following animals: a bird, an owl, a sheep, a cow, a dog, a frog, a cat, a monkey, a fish, a penguin, a pig, a squirrel, a bear, a lion, a dragon, a horse, an insect, a goat, a raccoon, a zebra, a tiger, an elephant, a ladybug, a bird, or a parrot.

In accordance with a second aspect of the present invention, there is provided an interactive teaching system, which includes: an interactive whiteboard having an outer display surface, the interactive whiteboard being operatively coupled to a data processing device; a manipulation device configured to be used with the interactive whiteboard, the manipulation device having an elongated rod; a body portion, the elongated rod being connected to the body portion at one of its ends, the body portion having a substantially flat surface that extends in a direction which is substantially parallel to the extending direction of the elongated rod; and a layer of foam disposed on the substantially flat surface of the body portion, the layer of foam having two substantially flat surfaces that are oriented generally parallel to one another, the first of the two substantially flat surfaces being an inner surface disposed adjacent to the substantially flat surface of the body portion, and the second of the two substantially flat surfaces being an outer surface that is disposed on a side of the layer of foam that is opposite to the side of the layer of foam on which the inner surface is disposed. In this embodiment, the outer surface of the layer of foam is configured to be displaced along the outer display surface of the interactive whiteboard so as to facilitate a manipulation of objects displayed on the interactive whiteboard by a user thereof.

In a preferred embodiment of this aspect of the present invention, the manipulation device further includes a gripping device disposed on an end of the elongated rod that is opposite to the end on which the elongated rod is connected to the body portion.

In another preferred embodiment, the body portion of the manipulation device has a semi-ellipsoidal shape.

In yet another preferred embodiment, the body portion of the manipulation device further includes a curved surface adjoining the substantially flat surface, the elongated rod being connected to a bottom portion of the curved surface.

In still another preferred embodiment, the elongated rod and/or the body portion of the manipulation device is formed from wood.

In yet another preferred embodiment, the elongated rod of the manipulation device is formed from plastic.

In still another preferred embodiment, the elongated rod of the manipulation device is formed from metal.

In yet another preferred embodiment, the elongated rod of the manipulation device has a length that is between approximately four to approximately eight times greater than a length of the body portion.

In still another preferred embodiment, the layer of foam of the manipulation device comprises a closed cell, ethylene-vinyl acetate (EVA) or a polyethylene (PE) craft foam.

In yet another preferred embodiment, the body portion of the manipulation device resembles one of the following animals: a bird, an owl, a sheep, a cow, a dog, a frog, a cat, a monkey, a fish, a penguin, a pig, a squirrel, a bear, a lion, a dragon, a horse, an insect, a goat, a raccoon, a zebra, a tiger, an elephant, a ladybug, a bird, or a parrot.

In accordance with a third aspect of the present invention, there is provided a manipulation device configured to be used with an interactive whiteboard, which includes: an elongated rod; a body portion, the elongated rod being connected to the body portion at one of its ends, the body portion having an outer surface; and a layer of foam disposed on the outer surface of the body portion, the layer of foam having two opposed surfaces, the first of the two opposed surfaces being an inner surface disposed adjacent to the outer surface of the body portion, and the second of the two opposed surfaces being an outer surface. In this embodiment, the outer surface of the layer of foam is configured to be displaced along an outer display surface of an interactive whiteboard so as to facilitate a manipulation of objects displayed on the interactive whiteboard by a user thereof.

In accordance with a fourth aspect of the present invention, there is provided an interactive teaching system, which includes: an interactive whiteboard having an outer display surface, the interactive whiteboard being operatively coupled to a data processing device; a manipulation device configured to be used with the interactive whiteboard, the manipulation device having an elongated rod; a body portion, the elongated rod being connected to the body portion at one of its ends, the body portion having an outer surface; and a layer of foam disposed on the outer surface of the body portion, the layer of foam having two opposed surfaces, the first of the two opposed surfaces being an inner surface disposed adjacent to the outer surface of the body portion, and the second of the two opposed surfaces being an outer surface. In this embodiment, the outer surface of the layer of foam is configured to be displaced along the outer display surface of the interactive whiteboard so as to facilitate a manipulation of objects displayed on the interactive whiteboard by a user thereof.

It is to be understood that the foregoing objects and summary, and the following detailed description of the present invention, are merely exemplary and explanatory in nature. As such, the foregoing objects and summary, and the following detailed description of the invention, should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF THE PREFERRED EMBODIMENTS OF THE INVENTION

Figure 1:
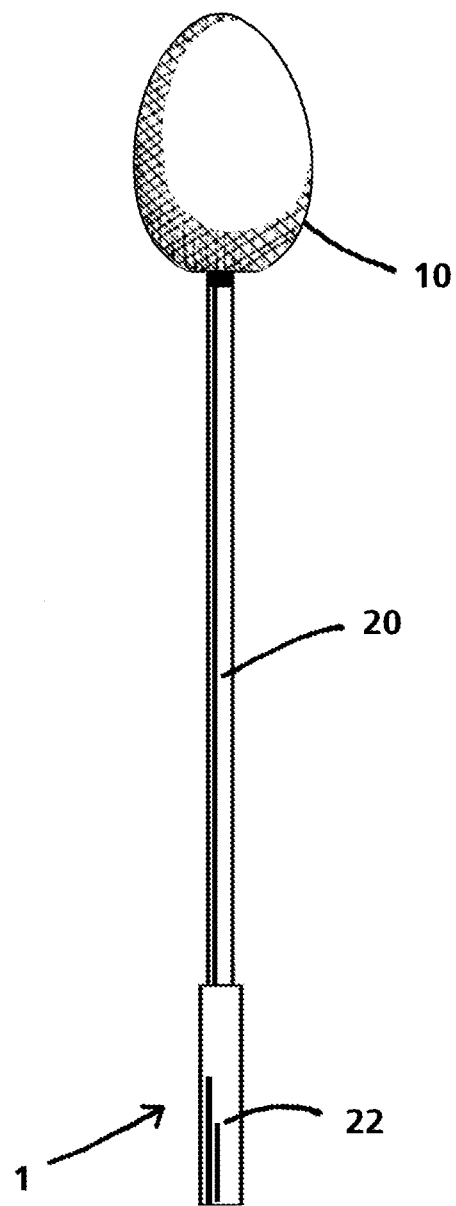
FIG. 1 is a front view of the manipulation device according to a first embodiment of the invention.
Figure 2:
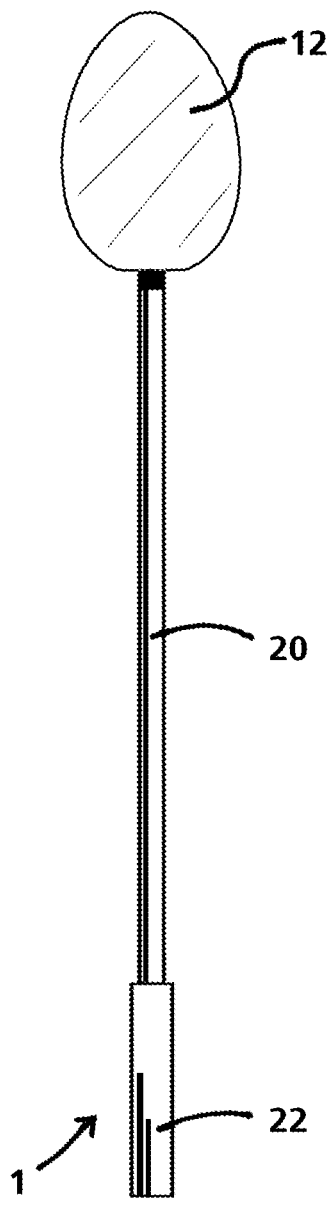
FIG. 2 is a back view of the manipulation device according to the first embodiment of the invention.
Figure 3:
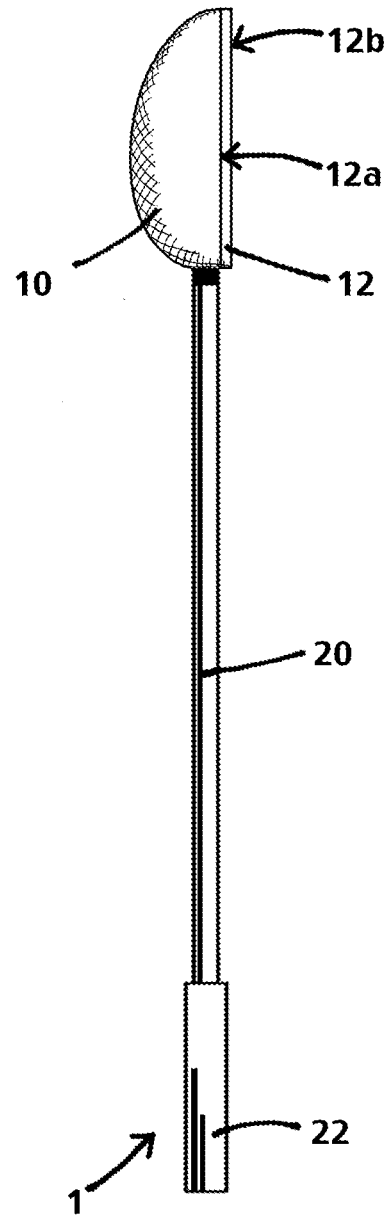
FIG. 3 is a side view of the manipulation device according to the first embodiment of the invention.

An embodiment of the manipulation device is seen generally at 1 in FIGS. 1-3. The manipulation device 1 of the depicted embodiment comprises a body portion 10, an elongated rod 20, and preferably, a gripping device 22. As seen in FIGS. 1-3, the elongated rod 20 has two oppositely disposed end portions. The body portion 10 is connected to the first end portion of the elongated rod 20, whereas the gripping device 22 is disposed around the outer circumference of the second end portion of the elongated rod 20. In a preferred embodiment, the manipulation device 1 is configured to be used with an interactive whiteboard system. The manipulation device 1 greatly facilitates a manipulation of objects on the interactive whiteboard by a user thereof.

Referring to FIGS. 2 and 3, it can be seen that the body portion 10 of the manipulation device 1 comprises a thin layer of foam 12 disposed on the back side thereof. The inner, front surface 12a of foam layer 12 is affixed to the rear surface of the body portion 10 by a suitable adhesive, such as hot glue or a clear, multi-purpose craft adhesive (e.g., E-6000®). The rear surface 12b of the foam layer 12 contacts the outer viewing surface of the interactive whiteboard. The foam layer 12 contributes substantially to the overall functionality of the manipulation device 1 because it greatly improves the interface between the manipulation device 1 and the interactive whiteboard by increasing the frictional contact between the two adjoining surfaces.

In a preferred embodiment, the thin layer of foam 12 comprises a closed cell, ethylene-vinyl acetate (EVA) craft foam or a polyethylene (PE) craft foam having a thickness of approximately 5/64 of an inch (2 mm), a hardness of 40 shore c, and a density of approximately 145 kg/m$^3$. However, it is to be understood that other types of foam having different material properties can be used without departing from the spirit and scope of the invention, provided that such other foam materials are suitable for manipulating objects on an interactive whiteboard.

While developing the present invention, the inventors found that craft foam grabbed electronic objects on the interactive whiteboard display surface much better than the other materials that were tested. In particular, during the development of their invention, the inventors tried various other materials, such as a cloth material, a tennis ball composite material, felt, and closed-cell extruded polystyrene (i.e., Styrofoam®). However, unlike the preferred thin sheet of craft foam, each of these materials did not suitably manipulate objects on the interactive whiteboard. Rather, these other materials tended to slide across the outer display surface of the interactive whiteboard without effectively grasping and moving the object being manipulated by the user.

Figure 4:
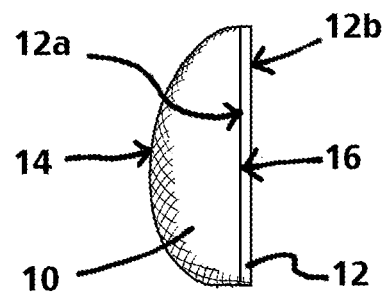
FIG. 4 is a side view of the body portion of the manipulation device according to the first embodiment of the invention.
Figure 5:
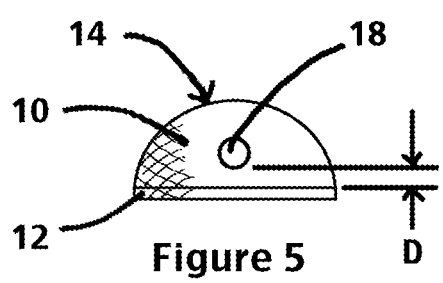
FIG. 5 is a bottom view of the body portion of the manipulation device according to the first embodiment of the invention.
Figure 6:
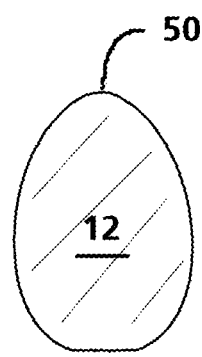
FIG. 6 is a back view of the body portion of the manipulation device according to the first embodiment of the invention.

Now, turning to FIGS. 4-6, the features of the body portion 10 of the manipulation device 1 will be described in detail. In a preferred embodiment, the body portion 10 has a semi-ellipsoidal shape, or partial egg shape. In particular, the body portion 10 is approximately in the form of a half-ellipsoidal solid, with a geometry that is characterized by an ellipsoid that has been split substantially in half along a longitudinal center plane, which contains the major axis of the ellipsoid therein. Referring initially to FIG. 4, it can be seen that the body portion 10 comprises a curved front side 14 and a substantially flat back side 16. As described above, the front surface 12a of foam layer 12 is affixed to the substantially flat back side 16 of the body portion 10. A circular hole 18 is provided in a bottom portion of the curved front side 14 of the body portion 10 for receiving the first end 24 of the elongated rod 20 (see FIGS. 5 and 7). The circular hole 18 has a substantially flat bottom disposed internally within the solid body portion 10 against which the first end 24 of the elongated rod 20 is pressed when the manipulation device 1 is being assembled.

In a preferred embodiment of the invention, the diameter of the hole 18 in the body portion 10 is approximately five sixteenths (5/16) of an inch. Also, in a preferred embodiment, the distance D from the bottom edge of the body portion 10 to the bottom edge of the circular hole 18 is approximately three sixteenths (3/16) of an inch (see FIG. 5). However, it is to be understood that these specific dimensions are merely exemplary, and that other suitable dimensions can be used without departing from the spirit and scope of the invention.

The inventors of the present invention chose to form the body portion 10 using a semi-ellipsoidal shape or partial egg shape for several reasons. Most importantly, the curved ends of the ellipsoidal shape (see FIG. 6) enables the manipulation device 1 to have a smaller back surface 16 with which to manipulate and drag objects on the interactive whiteboard, thereby increasing its overall functionality. Also, the narrower tip portion 50 of the semi-ellipsoidal body 10 (see FIG. 6) is ideal for pointing to various objects that are disposed on the outer display surface of the interactive whiteboard. In addition, the curved front side 14 has a large surface area that is particularly well-suited for accommodating decorations. The oval periphery of the body portion 10 also facilitates the various design schemes that the inventors have developed for the manipulation device 1.

In a preferred embodiment, the length of the semi-ellipsoidal solid that is used for the body portion 10 has a length extending in the direction of its longitudinal major axis of between approximately one and one-half (1½) inches and approximately two and one-half (2½) inches (or between one and one-half inches and two and one-half inches), with lengths of approximately one and one-half (1½) inches, two (2) inches, and two and one-half (2½) inches being the most preferred. Also, in a preferred embodiment, when a semi-ellipsoidal solid has a length approximately two and one-half (2½) inches, it has width of approximately one and three-eighths (1⅜) inches in the location of its minor axis. However, one of ordinary in the art will appreciate that the present invention is not limited to these aforedescribed lengths and width. Rather, other lengths and widths for the body portion 10 may be used without departing from the spirit of the invention, provided that the selected length, width, and overall size of the body portion 10 does not have deleterious effects on its functionality. For example, if the body portion 10 was formed using a length of greater than two and one-half (2½) inches, it may become too heavy and cumbersome for use by small children who have limited strength and small hands.

Also, while it is preferred to form the body portion 10 from a semi-ellipsoidal solid, it is to be understood that the present invention is not so limited. Rather, the inventors have contemplated using spheres and prisms for the body portion 10, as possible alternatives to semi-ellipsoidal solids.

Figure 7:
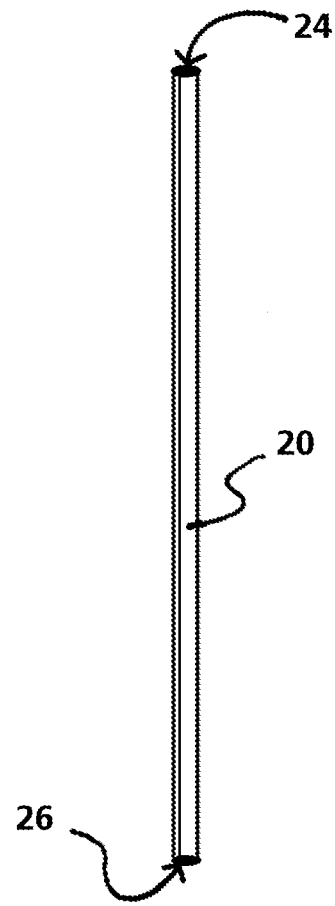
FIG. 7 is a perspective view of the elongated rod of the manipulation device according to the first embodiment of the invention.

Next, the elongated rod 24 of the manipulation device 1 will be described. As shown in FIG. 7, the elongated rod 24 comprises a first end 24 and an opposite, second end 26. The first and second ends 24, 26 define the longitudinal extents of the elongated rod 20. The first end 24 of the elongated rod 20 is inserted into the hole 18 of body portion 10, and the two components 10, 20 are secured together using an adhesive, such as hot glue or a clear, multi-purpose craft adhesive (e.g., E-6000®). The second end 26 of the elongated rod 20 is grasped by a user while he or she is using the manipulation device 1 to manipulate objects on the interactive whiteboard. In a preferred embodiment of the invention, the second end 26 of the elongated rod 20 is provided with a gripping device 22. As best shown in FIG. 1-3, the gripping device 22 preferably covers approximately at least one-sixth (⅙) of the overall length of the elongated rod 20 so that a majority of a user's hand contacts the gripping device 22, rather than the outer surface of the elongated rod 20. This design enables a user to maintain a better grip on the manipulation device 1 when he or she is moving it across the outer surface of the interactive whiteboard. The gripping device 22 is preferably formed from a generally annular rubber grip.

In a preferred embodiment of the invention, the elongated rod 20 has a diameter of approximately five-sixteenths (5/16) of an inch and a length of approximately twelve (12) inches. Using a diameter of five-sixteenths (5/16) of an inch for the elongated rod 20 is advantageous because it is small enough to be easily grasped by the small hands of children. Also, because some commercially available gripping devices 22 are formed using an inside diameter of approximately five-sixteenths (5/16) of an inch, the selection of this particular diameter reduces the manufacturing and/or assembly cost of the manipulation device 1. Selecting an overall length of twelve (12) inches for the elongated rod 20 improves the functionality of the manipulation device 1 because it provides sufficient length such that users of a small stature, such as young children, are able reach the top part of the interactive whiteboard without using a stool. Because stools pose a safety hazard to small children, alleviating their use when teaching sessions are being carried out on an interactive whiteboard is highly desirable. While it is preferred to form the elongated rod 20 using the dimensions aforedescribed, it is to be understood that the present invention is not so limited. Rather, the elongated rod 20 can be formed using other diameters and lengths, provided that these other dimensions for the elongated rod 20 are congruent with the intended functionality of the elongated rod 20.

In a preferred embodiment, both the body portion 10 and the elongated rod 20 of the manipulation device 1 are formed from wood. In this preferred embodiment, the body portion 10 is formed from a wooden egg-shaped solid that is vertically cut in half, whereas the elongated rod 20 is formed from a wooden dowel rod. However, one of ordinary skill in the art will appreciate that the body portion 10 and the elongated rod 20 can be formed using other suitable materials without departing from the spirit and scope of the invention such as, but not limited to, metal or plastic.

Figure 8:
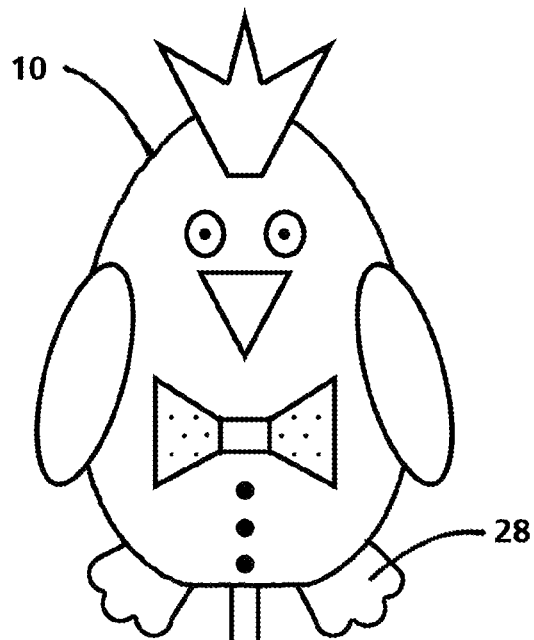
FIG. 8 is a front view of the body portion of the manipulation device according to a second embodiment of the invention.
Figure 9:
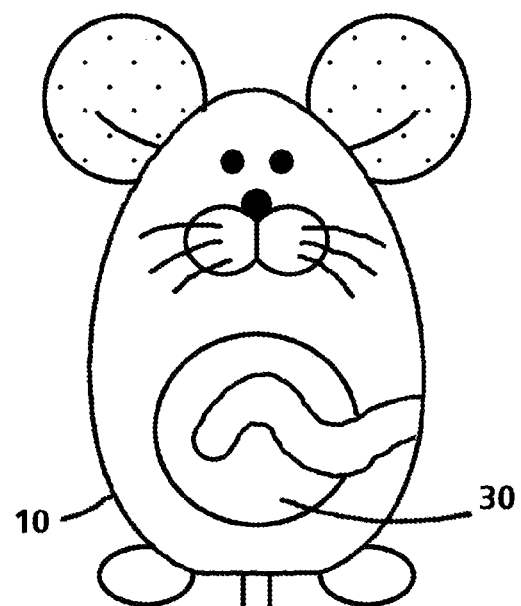
FIG. 9 is a front view of the body portion of the manipulation device according to a third embodiment of the invention.
Figure 10:
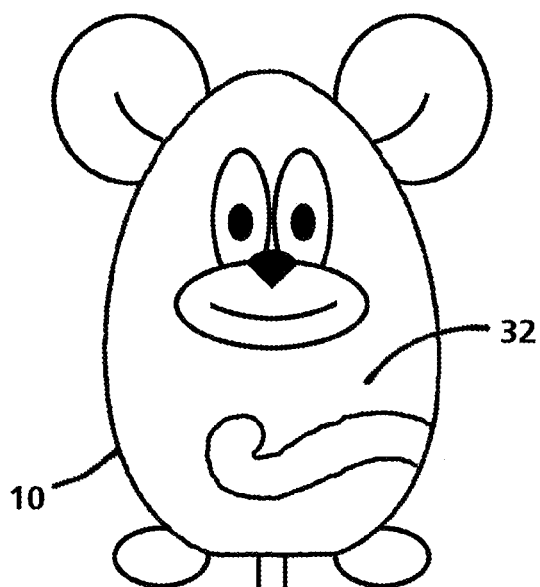
FIG. 10 is a front view of the body portion of the manipulation device according to a fourth embodiment of the invention.
Figure 11:
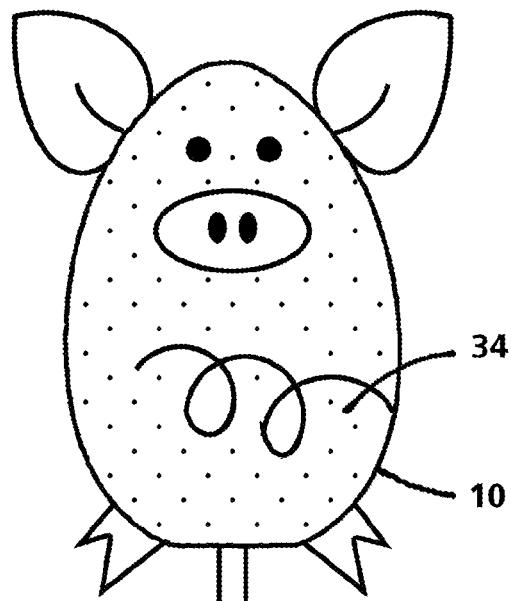
FIG. 11 is a front view of the body portion of the manipulation device according to a fifth embodiment of the invention.
Figure 12:
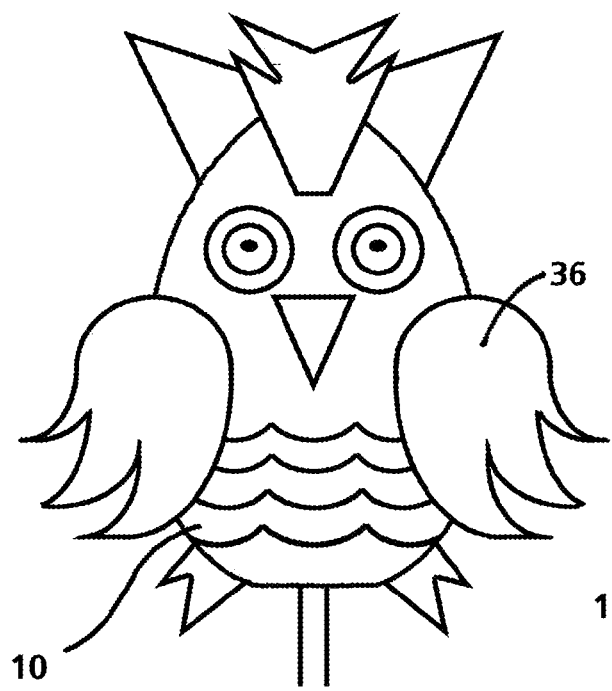
FIG. 12 is a front view of the body portion of the manipulation device according to a sixth embodiment of the invention.
Figure 13:
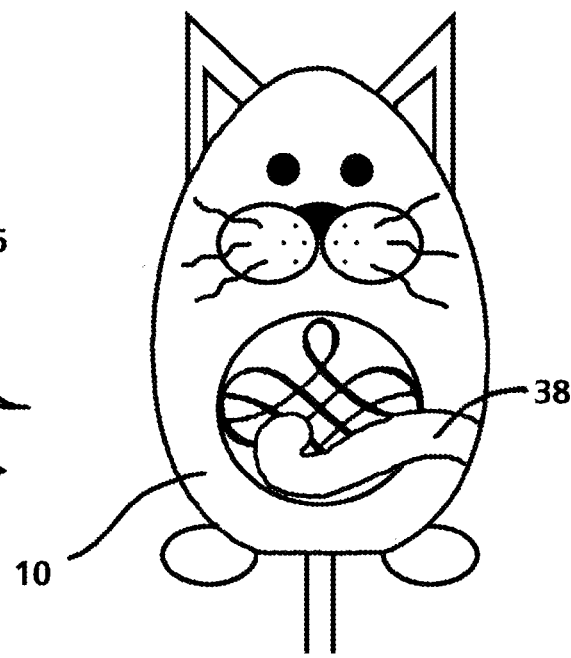
FIG. 13 is a front view of the body portion of the manipulation device according to a seventh embodiment of the invention.
Figure 14:
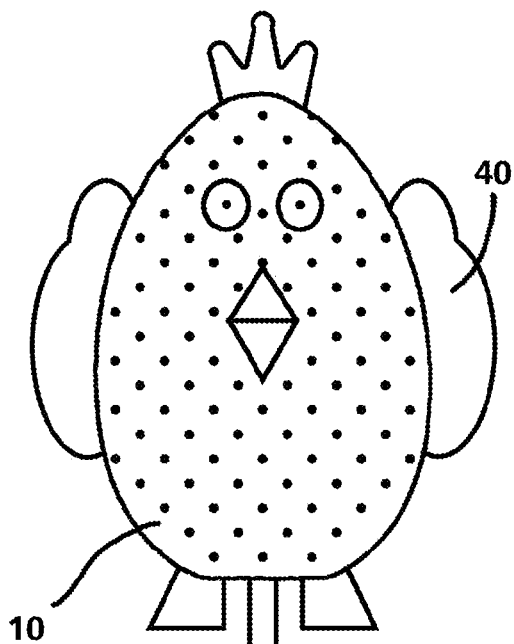
FIG. 14 is a front view of the body portion of the manipulation device according to an eighth embodiment of the invention.
Figure 15:
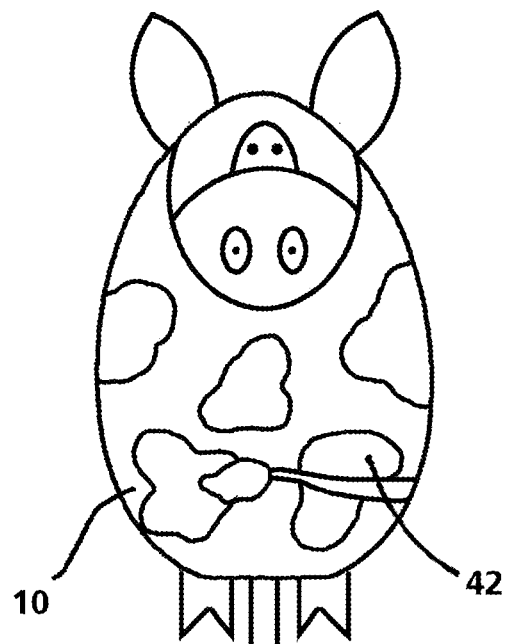
FIG. 15 is a front view of the body portion of the manipulation device according to a ninth embodiment of the invention.
Figure 16:
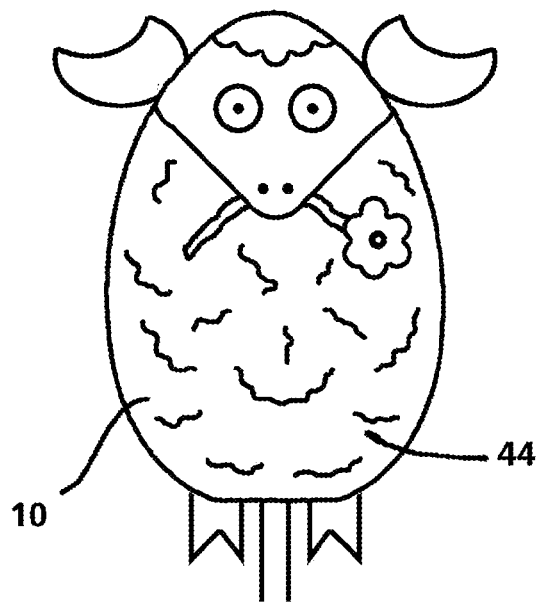
FIG. 16 is a front view of the body portion of the manipulation device according to a tenth embodiment of the invention.
Figure 17:
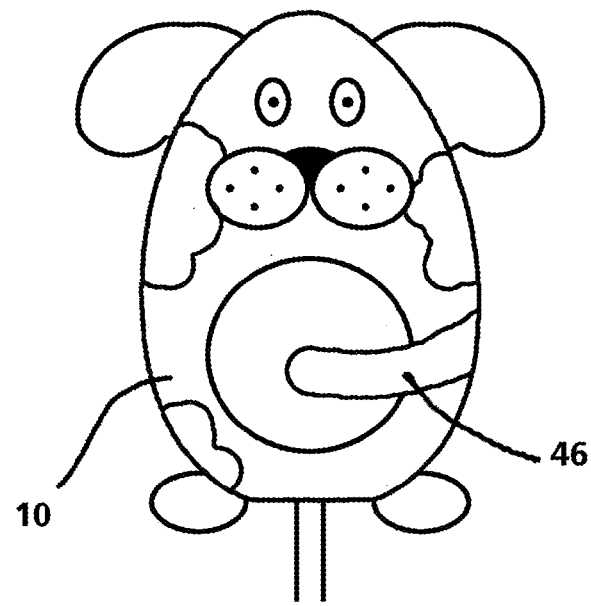
FIG. 17 is a front view of the body portion of the manipulation device according to an eleventh embodiment of the invention.
Figure 18:
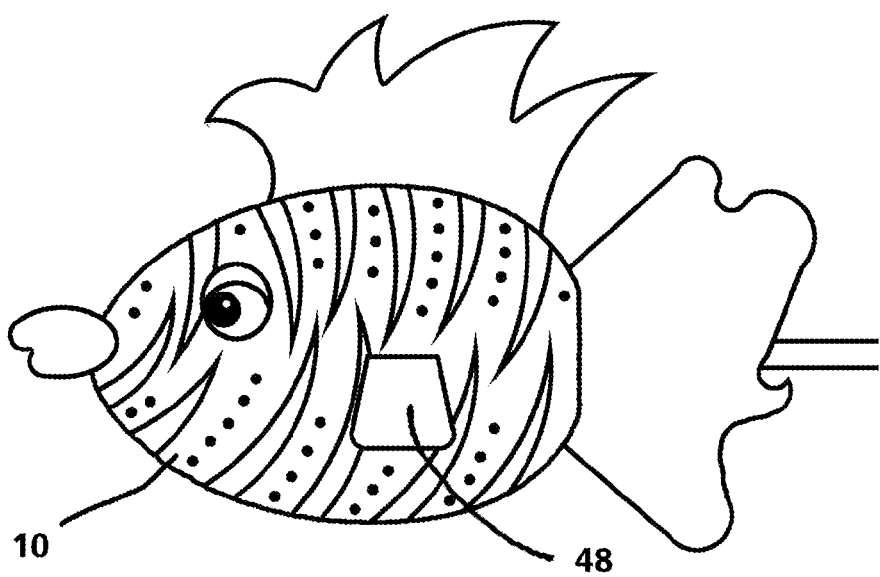
FIG. 18 is a front view of the body portion of the manipulation device according to a twelfth embodiment of the invention.

In FIGS. 8-18, a plurality of different embodiments of the body portion 10 are depicted. The inventors of the present invention have developed various design options for the body portion 10 in order to make the manipulation device 1 more aesthetically pleasing, and more attractive to the users thereof. For young children, these designs involve decorating the body portion 10 so that it resembles various types of animals. In FIGS. 8 and 9, the body portions 10 are designed so as to resemble a penguin 28 and a mouse 30, respectively. Similarly, in FIGS. 10, 11, 12, and 13, the body portions 10 take the form of a monkey 32, a pig 34, an owl 36, and a cat 38, respectively. Finally, in FIGS. 14-18, the body portions 10 are designed so as to resemble a bird 40, a cow 42, a sheep 44, a dog 46, and a fish 48. In addition to the animals that are explicitly depicted in FIGS. 8-18, the inventors have also contemplated decorating the body portion 10 so as to resemble the following other animals: a frog, a squirrel, a bear, a lion, a dragon, a horse, miscellaneous bugs, a goat, a raccoon, a zebra, a tiger, an elephant, a ladybug, miscellaneous birds, and a parrot.

Figure 19:
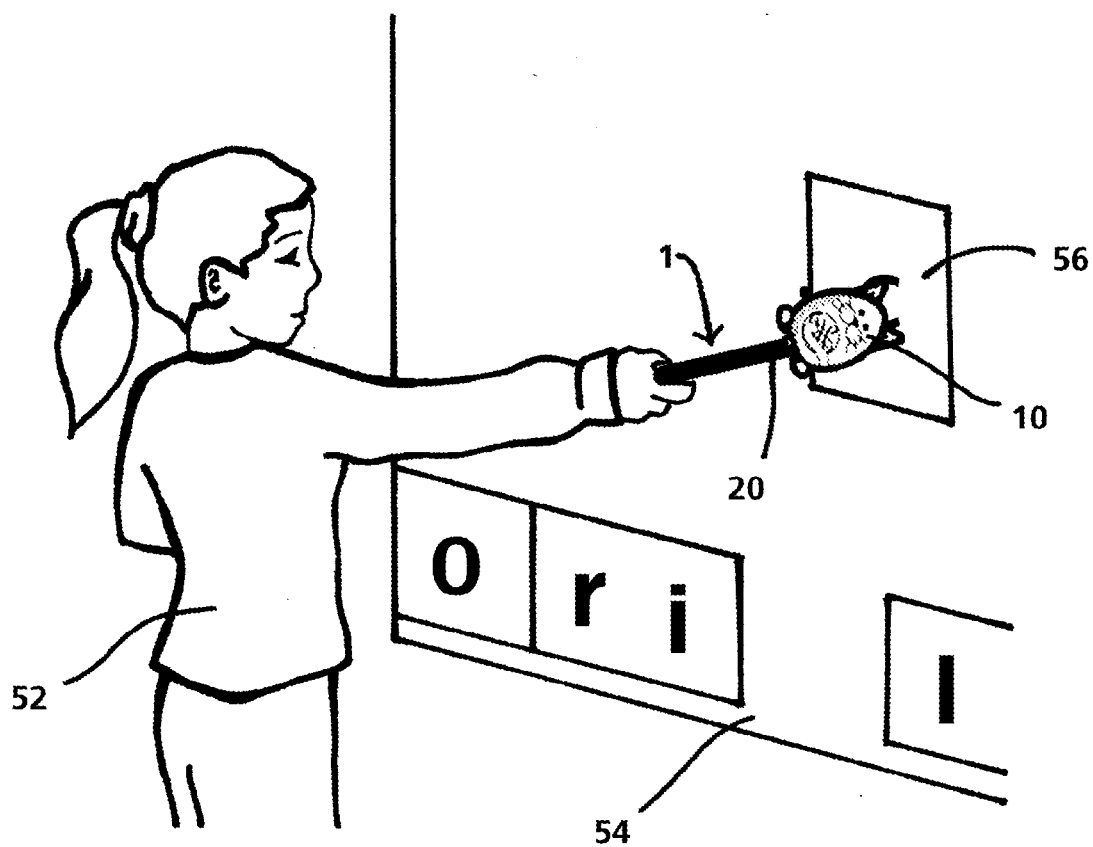
FIG. 19 is a perspective view of the interactive teaching system according to a first embodiment of the invention.

A perspective view of an interactive teaching system is illustrated in FIG. 19. As shown in this figure, a user 52 holds the elongated rod 20 of the manipulation device 1 in her hand, and uses the manipulation device 1 to select and/or move electronic objects 56 on the display surface of an interactive whiteboard 54. During the utilization of the manipulation device 1, the user 52 contacts the outer display surface of the interactive whiteboard 54 with the foam layer 12. The manipulation device 1 with the foam layer 12 attached to the back side 16 thereof greatly enhances the ability of the user 52 to effectively manipulate the objects 56 on the display surface of the interactive whiteboard 54. While not explicitly shown in FIG. 19, the interactive whiteboard 54 is operatively coupled to a data acquisition/data processing device (i.e., a computer) and a projector. The projector projects the desktop of the computer onto the interactive whiteboard's outer front surface.

Figure 20:
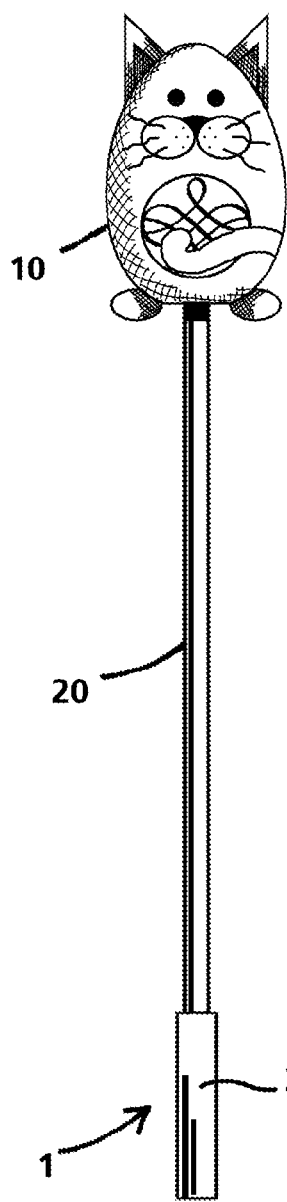
FIG. 20 is a frontal perspective view of the manipulation device according to another embodiment of the invention, wherein the manipulation device is illustrated with a gripping device thereon.
Figure 21:
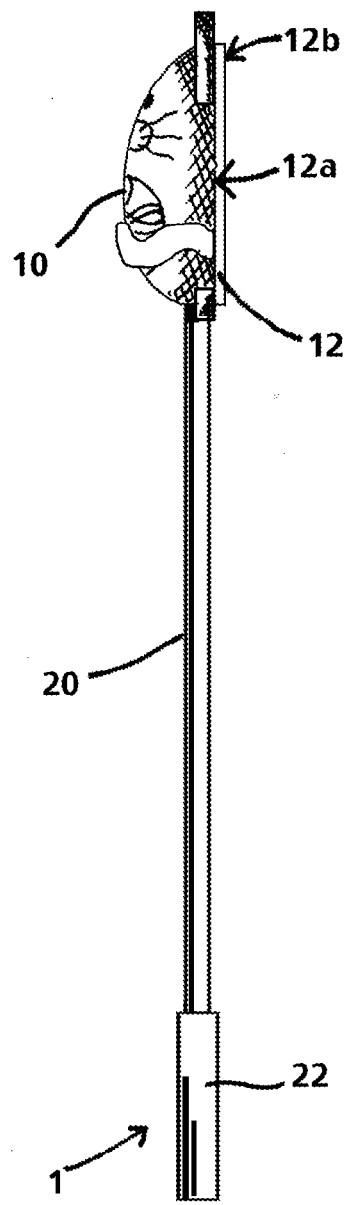
FIG. 21 is a side perspective view of the manipulation device according to another embodiment of the invention, wherein the manipulation device is illustrated with a gripping device thereon.
Figure 22:
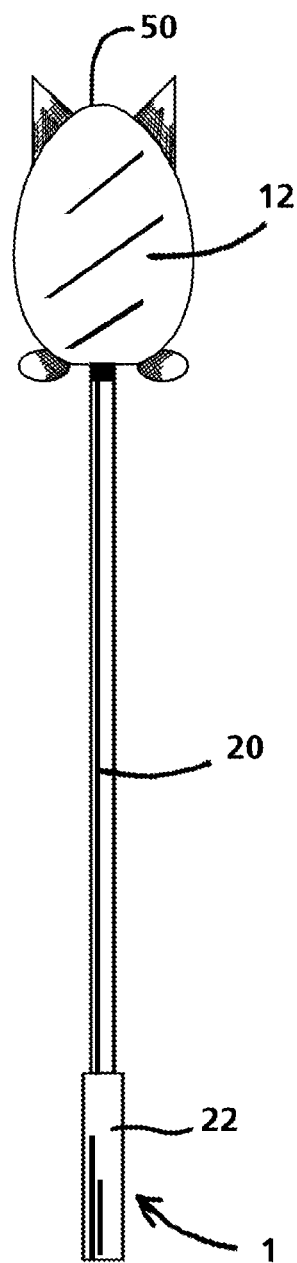
FIG. 22 is a rear perspective view of the manipulation device according to another embodiment of the invention, wherein the manipulation device is illustrated with a gripping device thereon.

In FIGS. 20-22, another embodiment of the manipulation device is depicted. As shown in FIG. 20, the front side of the body portion 10 of the manipulation device 1 preferably is decorated so as to resemble a particular type of animal (e.g., a cat). The side perspective view of the manipulation device 1 shown in FIG. 21 clearly illustrates the semi-ellipsoidal shape of the body portion 10. A rear perspective view of the manipulation device 1 is depicted in FIG. 22. It can be seen in this figure that the body portion 10 is provided with a foam layer 12 disposed on substantially the entire back surface thereof. As previously described, the foam layer 12 greatly facilitates the manipulation of objects on the display surface of the interactive whiteboard.

Figure 23:
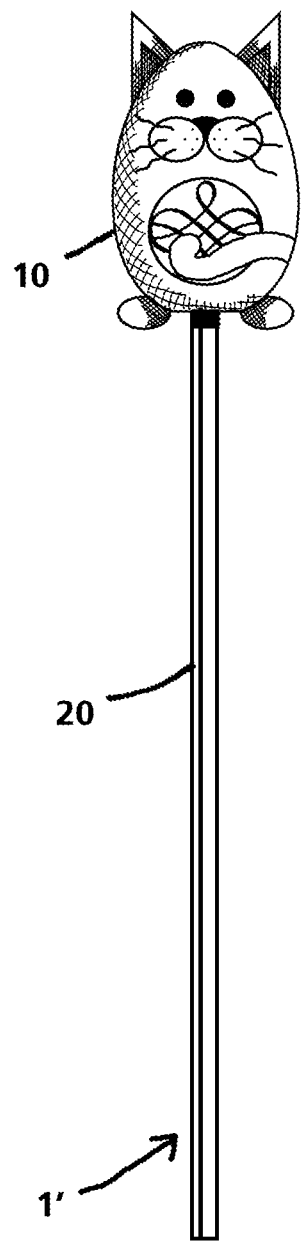
FIG. 23 is a frontal perspective view of the manipulation device according to yet another embodiment of the invention, wherein the manipulation device is illustrated without a gripping device thereon.
Figure 24:
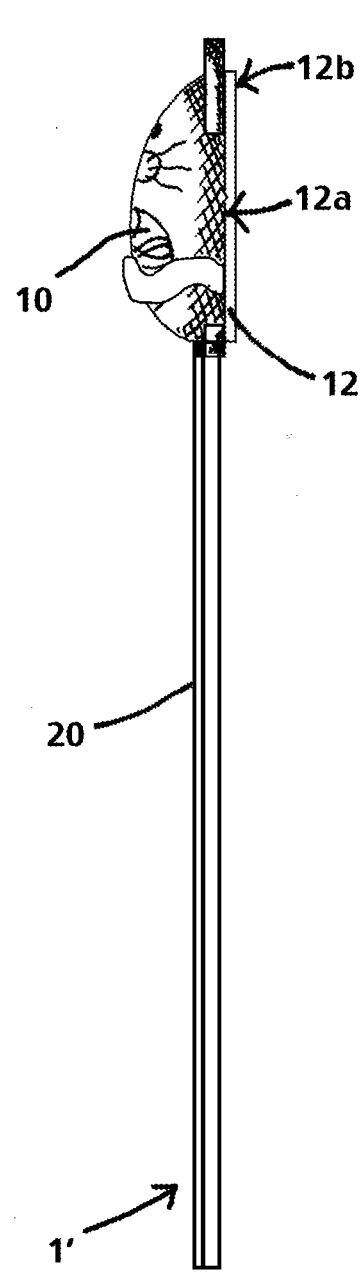
FIG. 24 is a side perspective view of the manipulation device according to yet another embodiment of the invention, wherein the manipulation device is illustrated without a gripping device thereon.
Figure 25:
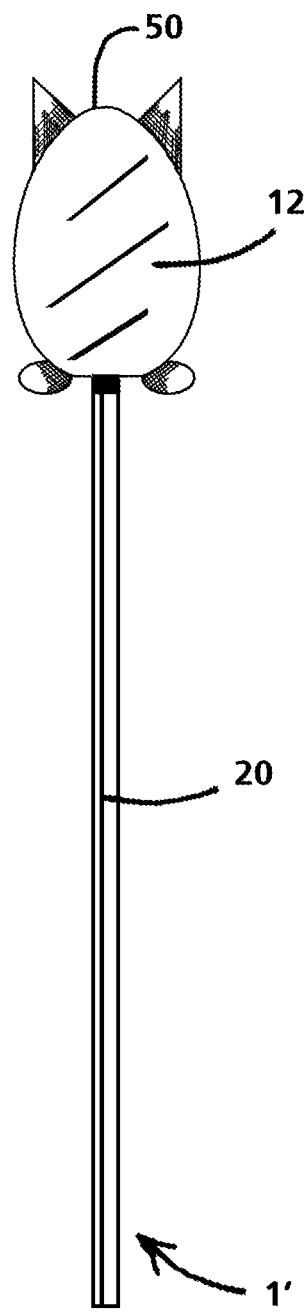
FIG. 25 is a rear perspective view of the manipulation device according to yet another embodiment of the invention, wherein the manipulation device is illustrated without a gripping device thereon.

Although the invention has been shown and described with respect to a certain embodiment or embodiments, it is apparent that this invention can be embodied in many different forms and that many other modifications and variations are possible without departing from the spirit and scope of this invention. For example, the elongated rod 20 can be provided without a gripping device 22 (refer to FIGS. 23-25). In such an embodiment, the user of the manipulation device 1' would simply grasp the exposed second end portion of the elongated rod 20. Moreover, as another example, the body portion 10 can be decorated using designs that are not in the form of animals. For example, in order to make the manipulation device 1 more appealing to older children, the body portion 10 could be decorated using simpler designs, such as stripes or polka dots.

While exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A manipulation device configured to be used with an interactive whiteboard, said manipulation device comprising:

an elongated rod having a first end and a second end, said first end being spaced apart from said second end in a longitudinal extending direction of said elongated rod, said elongated rod further including a circular cross-section with an outer circular wall, said outer circular wall extending from said first end to said second end of said elongated rod;

a body portion having a hole disposed therein and a tip portion disposed on an opposite end of said body portion as compared to said hole, said first end of said elongated rod being received within said hole of said body portion, said tip portion of said body portion being formed by converging side edges of said body portion, said body portion further including a substantially flat surface that extends in a direction which is substantially parallel to said longitudinal extending direction of said elongated rod; and a layer of foam disposed on said substantially flat surface of said body portion and spaced apart from said hole in said body portion by a section of said body portion, said layer of foam having two substantially flat surfaces that are oriented generally parallel to one another, a first of said two substantially flat surfaces being an inner surface disposed adjacent to said substantially flat surface of said body portion, and a second of said two substantially flat surfaces being an outer surface that is disposed on a side of said layer of foam that is opposite to a side of said layer of foam on which said inner surface is disposed, said layer of foam comprising a closed cell, ethylene-vinyl acetate (EVA) or a polyethylene (PE) craft foam having a thickness of approximately 2 millimeters, a hardness of 40 shore C, and a density of approximately 145 kilograms per cubic meter;

wherein said outer surface of said layer of foam is configured to be displaced along, and in contact with, an outer display surface of an interactive whiteboard so as to facilitate a manipulation of objects displayed on said interactive whiteboard by a user thereof.

2. The manipulation device according to claim 1, further comprising a gripping device disposed on said second end of said elongated rod that is opposite to said first end that is received within said hole in said body portion, said gripping device being in the form of a generally annular rubber grip.

3. The manipulation device according to claim 1, wherein said body portion has a semi-ellipsoidal shape, said body portion having a longitudinal major axis and a transverse minor axis, wherein a length of said longitudinal major axis is greater than a length of said transverse minor axis.

4. The manipulation device according to claim 1, wherein said body portion further includes a curved surface adjoining an outer periphery of said substantially flat surface, said elongated rod being connected to a bottom portion of said curved surface, said bottom portion of said curved surface circumscribing said outer circular wall of said elongated rod.

5. The manipulation device according to claim 1, wherein said elongated rod and said body portion are formed from wood.

6. The manipulation device according to claim 1, wherein said elongated rod is formed from plastic.

7. The manipulation device according to claim 1, wherein said elongated rod is formed from metal.

8. The manipulation device according to claim 1, wherein said elongated rod has a length that is between approximately four to approximately eight times greater than a length of said body portion.

9. The manipulation device according to claim 1, wherein said body portion resembles one of the following animals: a bird, an owl, a sheep, a cow, a dog, a frog, a cat, a monkey, a fish, a penguin, a pig, a squirrel, a bear, a lion, a dragon, a horse, an insect, a goat, a raccoon, a zebra, a tiger, an elephant, a ladybug, a bird, or a parrot.

10. An interactive teaching system, said system comprising:
   an interactive whiteboard having an outer display surface, said interactive whiteboard being operatively coupled to a data processing device;
   a manipulation device configured to be used with said interactive whiteboard, said manipulation device including:
      an elongated rod having a first end and a second end, said first end being spaced apart from said second end in a longitudinal extending direction of said elongated rod, said elongated rod further including a circular cross-section with an outer circular wall, said outer circular wall extending from said first end to said second end of said elongated rod;
      a body portion having a hole disposed therein and a tip portion disposed on an opposite end of said body portion as compared to said hole, said first end of said elongated rod being received within said hole of said body portion, said tip portion of said body portion being formed by converging side edges of said body portion, said body portion further including a substantially flat surface that extends in a direction which is substantially parallel to said longitudinal extending direction of said elongated rod; and
      a layer of foam disposed on said substantially flat surface of said body portion and spaced apart from said hole in said body portion by a section of said body portion, said layer of foam having two substantially flat surfaces that are oriented generally parallel to one another, a first of said two substantially flat surfaces being an inner surface disposed adjacent to said substantially flat surface of said body portion, and a second of said two substantially flat surfaces being an outer surface that is disposed on a side of said layer of foam that is opposite to a side of said layer of foam on which said inner surface is disposed;
      wherein said outer surface of said layer of foam is configured to be displaced along, and in contact with, said outer display surface of said interactive whiteboard so as to facilitate a manipulation of objects displayed on said interactive whiteboard by a user thereof,
      wherein said layer of foam of said manipulation device comprises a closed cell, ethylene-vinyl acetate (EVA) or a polyethylene (PE) craft foam having a thickness of approximately 2 millimeters, a hardness of 40 shore C, and a density of approximately 145 kilograms per cubic meter.

11. The interactive teaching system according to claim 10, wherein the manipulation device further comprises a gripping device disposed on said second end of said elongated rod that is opposite to said first end that is received within said hole in said body portion, said gripping device being in the form of a generally annular rubber grip.

12. The interactive teaching system according to claim 10, wherein said body portion of said manipulation device has a semi-ellipsoidal shape, said body portion having a longitudinal major axis and a transverse minor axis, wherein a length of said longitudinal major axis is greater than a length of said transverse minor axis.

13. The interactive teaching system according to claim 10, wherein said body portion of said manipulation device further includes a curved surface adjoining an outer periphery of said substantially flat surface, said elongated rod being connected to a bottom portion of said curved surface, said bottom portion of said curved surface circumscribing said outer circular wall of said elongated rod.

14. The interactive teaching system according to claim 10, wherein said elongated rod and said body portion of said manipulation device are formed from wood.

15. The interactive teaching system according to claim 10, wherein said elongated rod of said manipulation device is formed from plastic.

16. The interactive teaching system according to claim 10, wherein said elongated rod of said manipulation device is formed from metal.

17. The interactive teaching system according to claim 10, wherein said elongated rod of said manipulation device has a length that is between approximately four to approximately eight times greater than a length of said body portion.

18. The interactive teaching system according to claim 10, wherein said first end of said elongated rod of said manipulation device is securely attached within said hole of said body portion by an adhesive.

19. A manipulation device configured to be used with an interactive whiteboard, said manipulation device comprising:
   an elongated rod having a first end and a second end, said first end being spaced apart from said second end in a longitudinal extending direction of said elongated rod, said elongated rod further including a circular cross-section with an outer circular wall, said outer circular wall extending from said first end to said second end of said elongated rod;
   a body portion having a hole disposed therein and a tip portion disposed on an opposite end of said body portion as compared to said hole, said first end of said elongated rod being received within said hole of said body portion, said tip portion of said body portion being formed by converging side edges of said body portion, said body portion further including an outer surface; and
   a layer of foam disposed on said outer surface of said body portion and spaced apart from said hole in said body portion by a section of said body portion, said layer of foam having two opposed surfaces, a first of said two opposed surfaces being an inner surface disposed adjacent to said outer surface of said body portion, and a second of said two opposed surfaces being an outer surface, said layer of foam comprising a closed cell, ethylene-vinyl acetate (EVA) or a polyethylene (PE) craft foam having a thickness of approximately 2 millimeters, a hardness of 40 shore C, and a density of approximately 145 kilograms per cubic meter;
   wherein said outer surface of said layer of foam is configured to be displaced along, and in contact with, an outer display surface of an interactive whiteboard so as to facilitate a manipulation of objects displayed on said interactive whiteboard by a user thereof.

* * * * *